United States Patent [19]
Queneau et al.

[11] 3,880,651
[45] Apr. 29, 1975

[54] CHLORINE LEACHING OF NON-FERROUS METAL VALUES WITH AMMONIACAL SOLUTIONS

[76] Inventors: Paul Etienne Queneau, Stone House, Cornish, N.H.; Herm Jan Roorda, Huis te Landelaan 273, Rijswijk, Netherlands; Stanley Charles Townshend, 77 Pontamman Rd., Ammanford, Carmarthenshire, Wales

[22] Filed: July 13, 1972

[21] Appl. No.: 271,589

[30] Foreign Application Priority Data
July 10, 1971 United Kingdom............... 33405/71
June 15, 1972 United Kingdom............... 28094/72

[52] U.S. Cl................ 75/82; 75/101 R; 75/103; 75/112; 75/117; 75/119; 75/121; 423/35; 423/37; 423/40; 423/50; 423/144; 423/149; 423/150

[51] Int. Cl.... C22b 3/00; C22b 15/10; C22b 23/04; C22b 47/00

[58] Field of Search......... 423/150, 32, 149, 50, 40, 423/39, 38, 493, 46, 51, 138, 140, 143; 75/112, 113, 119, 103, 114, 121, 111

[56] References Cited
UNITED STATES PATENTS

| | | |
|---|---|---|
| 2,478,942 | 8/1949 | Queneau et al...................... 75/103 |
| 2,556,215 | 6/1951 | Queneau et al...................... 75/103 |
| 2,835,569 | 5/1958 | Reynaud et al...................... 75/118 |
| 2,998,311 | 8/1961 | Illis et al. .............................. 75/113 |
| 3,130,043 | 4/1964 | Lichty................................ 423/150 |
| 3,466,167 | 9/1969 | Illis .................................... 423/150 |
| 3,714,326 | 1/1973 | Matson .............................. 423/150 |
| 3,725,527 | 4/1973 | Yamamura et al. ................ 423/493 |

*Primary Examiner*—Oscar R. Vertiz
*Assistant Examiner*—Brian E. Hearn
*Attorney, Agent, or Firm*—Ewan C. MacQueen

[57] ABSTRACT

A ferruginous material containing at least one nonferrous value selected from the group consisting of nickel, cobalt, copper and manganese is, after reduction, immersed in water and then contacted with gaseous chlorine until the pH value of the immersion decreases to below 4 and sufficient amounts of ammonia or ammonia-containing compounds are added with the chlorine to maintain the pH value between about 4 and 2 so as to dissolve a preponderant part of the non-ferrous metal values and only minor amounts of iron. The non-ferrous value is recovered from the resulting solution. The ferruginous material can be an oxide ore, including sea nodules, or a roasted sulfide ore that has been reduced, advantageously selectively reduced.

29 Claims, No Drawings

CHLORINE LEACHING OF NON-FERROUS METAL VALUES WITH AMMONIACAL SOLUTIONS

The present invention pertains to the recovery of non-ferrous metal values, such as nickel, cobalt, copper or manganese from materials that also contain substantial amounts of iron, and more particularly to the recovery of non-ferrous metal values by a combination of pyrometallurgical and hydrometallurgical operations.

It has been previously found that when gaseous chlorine is passed under controlled conditions into an aqueous immersion of a material containing one or more of nickel, cobalt and copper together with iron, substantially all of these metals that are in the metallic form are rapidly and selectively converted to their respective chlorides and go into solution, while substantially all the iron present as oxides remains undissolved.

A process, based on this discovery and described in Canadian Pat. application Ser. No. 124,806, filed Oct. 8, 1971, proposes to selectively reduce an oxide material containing iron together with a substantially lesser amount of one or more of nickel, cobalt and copper so as to convert to metal substantially all of the nickel, cobalt and copper but only a minor proportion of the iron present, and then to pass gaseous chlorine into an aqueous immersion of the reduced material. In order to reduce substantially all the nickel, cobalt and copper to metal, some iron must also be reduced to metal, and this is chlorinated and dissolved and contaminates the resulting solution of nickel, cobalt and copper. In some cases the iron content of the solution can be as much as twice the non-ferrous metal content.

It has now been found that if special reagents are added to the immersion to control the pH during the chlorination, the dissolution of iron is inhibited and a lesser amount of iron is dissolved, with little or no detriment to the solution of nickel, cobalt and copper while solution of manganese is promoted. Thus by the process described later in the specification the pregnant liquor iron content can be as little as one-tenth of the non-ferrous metal content. Moreover, when nickel is present, cationic complexes of nickel can be produced which are advantageous in isolating nickel.

Generally speaking, the present invention contemplates a process for selectively leaching at least one reduced non-ferrous metal value selected from the group consisting of nickel, cobalt, copper and manganese from a ferruginous material containing the non-ferrous metal value. An aqueous immersion of the ferruginous material is formed, and gaseous chlorine is introduced into the immersion to chlorinate the reduced non-ferrous metal value and to produce an aqueous solution of chlorinated non-ferrous metal values. At least one compound selected from the group consisting of ammonia and ammonia-containing compounds is added in amounts which maintain the pH value of the immersion between about 4 and 2 to extract a preponderant part of the non-ferrous values and only minor amounts of iron. The non-ferrous metal values are recovered from the aqueous solution.

The invention is particularly useful for the treatment of materials obtained by the reduction of oxide materials containing iron together with one or more of nickel, cobalt, copper and manganese. Such oxide materials include the oxide ores of nickel, including limonitic and silicate types, manganiferous ores, including deep sea manganese nodules, and also oxide materials produced artificially by roasting nickeliferous, cobaltiferous and cupriferous sulfide ores, concentrates and metallurgical intermediates, e.g., slags, whether or not they contain other elements such as arsenic. The oxide materials can be selectively reduced so as to reduce to metal substantially all of the nickel, cobalt and copper but only a minor proportion of the manganese and iron present, but the inhibition of the dissolution of iron by the ammonia renders highly selective reduction less important, particularly if the ratio of iron to the combined total of nickel, cobalt and copper is not too high, e.g., does not exceed 10:1 by weight.

Ores, oxide or silicate, containing relatively small amounts of nickel, cobalt and copper together with relatively larger amounts of manganese and iron, including those ores that occur in large quantities as deposits on the ocean bed, commonly known as deep sea manganese nodules, can advantageously be treated by the process in accordance with the present invention. Generally speaking, the manganiferous ores treated will contain, by weight on a dry basis, at least 10% manganese, at least 6% iron, and not more than 3% in total of nickel, cobalt and copper, though the invention is not restricted to such ores provided the contents of manganese and iron are each substantially larger than, e.g., twice as large as the total content of nickel, cobalt and copper. Typical samples of manganese nodules had the following compositions, the balance in each case being combined oxygen:

|  | Sample A | Sample B |
|---|---|---|
| % Ni | 0.93 | 0.74 |
| % Co | 0.10 | 0.14 |
| % Cu | 0.55 | 0.44 |
| % Mn | 20.8 | 17.4 |
| % Fe | 8.5 | 11.4 |
| % $Al_2O_3$ | 5.9 | 4.5 |
| % CaO | 1.4 | 4.6 |
| % MgO | 1.1 | 3.0 |
| % $Na_2O$ | 2.2 | 1.9 |
| % $K_2O$ | 1.4 | 1.2 |
| % Cl | 0.9 | 0.8 |
| % $SiO_2$ | 13.8 | 10.8 |
| % Combined $H_2O$ | 30.4 | n.d. | n.d. = not determined

The roasting of sulfide materials such as pyrite and pyrrhotite concentrates and mattes to form oxide materials suitable for treatment can be carried out either in air or in oxygen-enriched air. Generally speaking, roasting temperatures of at least about 600°C. and up to about 1,000°C. can be used, but in any event the temperature should be above that at which the metals form stable sulfates in the atmosphere used. Advantageously, the roasting temperature is in the range between about 700°C. and 900°C. In order to obtain a readily reducible calcine when roasting pyrrhotite, however, the temperature should not exceed about 800°C. The roasting should be continued until the sulfur content of the material is as low as practicable, e.g., less than about 1% and most advantageously less than about 0.25%.

In order to provide efficient reduction and subsequent chlorination, as well as to insure stable immersions during chlorination, the ferruginous material containing the non-ferrous metal values is finely divided. Nickeliferous lateritic ores, particularly the limonitic type, naturally occur in finely divided form and usually require no grinding. Artificially produced oxide materials, such as roasted pyrrhotite, are generally sufficiently finely divided as a result of initial beneficiation and roasting operations that further comminution is unnecessary. However, if the ferruginous oxide material is massive, e.g., manganiferous deep sea nodules, it is crushed and ground to at least 100% minus 30 mesh in order to provide good gas-solid contact in both the reduction and chlorination treatments and to insure stable slurries for the chlorination treatment.

Methods of selectively reducing oxide materials containing iron and one or more of nickel, cobalt and copper are well known. If the oxide material contains less than about 5% iron or if the ratio of non-ferrous metal values to iron is greater than about 1:3, the oxide material can be treated with any suitable reductant to insure substantially complete reduction of the nickel, cobalt and copper values without regard to the amount of iron reduced to the metallic state. In such materials, the amount of iron dissolved during chlorination is usually not sufficiently material as to warrant special precautions during reduction. If the oxide material contains more than about 5% iron or if the ratio of non-ferrous metal values to iron is less than about 1:3, substantially all the nickel, cobalt and copper compounds present are reduced to the metallic state and any manganese values to manganous oxide while as little as practicable of the iron and other oxides is so reduced. However, in order to reduce substantially all the nickel, cobalt and copper some iron must also be reduced to metal. The ratio of metallic iron to the total amount of metallic nickel, cobalt and copper in the reduced material is usually at least about 1:1 by weight, but preferably this ratio does not exceed about 3:1 and advantageously it does not exceed about 2:1. In any case, to avoid the dissolution of excessive amounts of iron and the consequent excessive consumption of chlorine the ratio should be less than about 5:1. The remainder of the iron oxide will be reduced to magnetite ($Fe_3O_4$) and wustite (FeO) in varying proportions. Advantageously, selective reduction, cooling after selective reduction, or both are conducted in a manner to maximize the magnetite to wustite ratio because magnetite does not react with chlorine while wustite can react with gaseous chlorine thereby increasing chlorine consumption.

It will be appreciated that the rate and extent of the reduction will depend on the temperature, the strength of the reducing atmosphere, the duration of the reduction, and the nature of the material being treated, and these must be correlated so as to maximize reduction of the nickel, cobalt and copper compounds to the metallic state and manganese values to the manganous state while minimizing the amount of iron oxide reduced to metal and wustite. If the atmosphere is too strongly reducing, the temperature too high or the duration too long, too much iron oxide will be reduced to metal and wustite, while the use of an atmosphere having too low a reducing potential results in a decrease in the rate and extent of reduction to metal of the nickel, cobalt and copper compounds. Generally speaking, the temperature in the reduction operation should be below about 950°C. but above about 300°C., for manganiferous ores and above about 500°C. for other ores, advantageously in in the range between about 600°C. and 850°C., and the reduction can be carried out in a selectively reducing atmosphere having a reducing potential equivalent to that of a gas containing carbon monoxide and carbon dioxide in a ratio of more than about 1:6 and less than about 2:1, advantageously not more than about 1:1, by volume.

It will be appreciated by those skilled in the art that the desired selective reduction can also be effected with the use of a non-selective reducing gas such as hydrogen by kinetic control of the reaction.

Subject to these considerations, any convenient procedure for selective reduction can be employed. Thus, the reducing atmosphere can be a gas mixture generated outside or inside the reduction vessel, or can be generated in contact with the material to be reduced by the cracking of oil sprayed on to the hot material or from coal admixed with the material.

The reduction conditions for the best results will also depend on the nature of the material being reduced. Thus, a nickeliferous limonite ore can advantageously be reduced in the temperature range between about 600°C. and 800°C. When nickel is to be recovered from nickeliferous magnesium silicate ores, the rate of heating and the extent of reduction within the temperature range at which the hydrated silicates decompose, generally between about 400°C. and 800°C., should be balanced in known manner so as to maximize nickel reduction at intermediate temperatures and to minimize formation of nickel-containing silicates at higher temperatures, due to the fact that nickel-containing silicates can only be reduced with great difficulty. Moreover, a high final temperature, e.g., above 750°C., is generally desirable during the reduction of such ores to ensure that the MgO and other basic constituents are substantially fixed by reaction with silica so as to form inactive silicates. Failure to fix MgO and other basic oxides in this way can lead to the excessive formation of magnesium chloride during the chlorination, involving increased chlorine consumption and the risk of other disadvantages. The use of high final temperatures improves reduction kinetics, facilitates combustion of hydrocarbons and enhances solid-liquid separations that follow leaching. In treating silicate ores, small amounts of such agents as pyrite or sodium chloride can, if desired, be added before the reduction to facilitate the operation in known manner.

The limonite and silicate ores of nickel commonly occur together, and it can, therefore, be advantageous to separate them in known manner so that each type of material can be reduced under the most suitable conditions. It can also be advantageous to treat only the limonite fraction of such mixed ores by the present process.

The reduced material should be cooled under conditions such that metallic nickel, cobalt and copper are not reoxidized, e.g., under a protective atmosphere. If desired, the hot reduced material can be subjected to slow cooling under a protective atmosphere in known manner to cause disproportionation of wustite into metal and magnetite or under an atmosphere selectively oxidizing to iron and wustite.

During such disproportionation, nickel and cobalt in the FeO lattice are released as metal and become available for extraction so that less remains in the iron oxide residue.

If excessive amounts of metallic iron are present the reduced material can be selectively reoxidized to convert part of the metallic iron to iron oxides, for example, by treatment below the reduction temperature with an atmosphere rich in carbon dioxide or water vapor. Thus, the hot reduced material can be rapidly cooled by direct contact with water, e.g., by spraying, so as to generate steam which serves to reoxidize part of the iron. The attack by the chlorine in the present process is so aggressive that this treatment does not appreciably interfere with the extraction of nickel, cobalt or copper, although it could passivate the reduced material against reaction with less reactive reagents, such as ammonia and carbon monoxide.

The reduced material, after comminution, if necessary, is immersed in an aqueous immersion for chlorination. Finely divided reduced material can be added to the aqueous medium to form immersions having a very wide range of solids contents, e.g., 10% to 80%. Reduced manganiferous ore may be slurried with an aqueous solution of ammonium chloride for chlorination. The solution advantageously contains at least about 1% by weight of ammonium chloride, and more advantageously from 2% to 25%. Higher concentrations can be employed, but are less economic.

The aqueous medium used to form the immersion can be water from any convenient source, and can contain chloride in solution, in a concentration of up to 20% or more by weight. Thus, sea water can be employed in place of fresh water; strong brine can be used to promote the formation of stable anionic complexes of cobalt and iron in solution; or a chloride solution produced by a previous chlorination in accordance with the invention can be used in order to obtain a more concentrated solution of the metals. Again, ammonium chloride can be present, e.g., as a result of the use of recycled process solutions.

If the material is sufficiently finely divided, it can be formed into a suspension in the aqueous medium. In any event care should be taken to ensure good contact between the solid, liquid and gas phases and to avoid localized variations in temperature, pH and concentration, and for this purpose vigorous agitation of the immersion is desirable. Agitation can be effected by mechanical stirring, pneumatically or by cascading in contact towers or by any other convenient means.

Gaseous chlorine is introduced into the aqueous immersion to chlorinate the reduced non-ferrous metal values as well as any metallized iron. The chlorine may be admixed with inert gas or oxygen, but preferably the ratio of oxygen to chlorine does not exceed about 5:1 by volume as higher proportions of oxygen can impair the extraction of nickel and cobalt. The chemical potentials and the kinetics of the reactions between the finely divided metallized non-ferrous metal values and molecular chlorine favor chlorination of the non-ferrous values over chlorination of oxides, such as magnesia and iron oxide. Moreover, the chemical potentials of the reactions between chlorine and oxides, such as magnesia, that have been fixed by thermal treatment during selective reduction, are not thermodynamically favorable and such oxides are dissolved in material amount only when substantial quantities of free acid are generated in the aqueous medium. Free acid is also effective in promoting the dissolution of unfixed oxides. Thus, when the free acid content of the aqueous medium starts to build up, as evidenced by pH values below about 4, e.g., below about 3, ammonia or other acid-neutralizing, ammonia-containing compounds are added to the aqueous medium to maintain the pH value thereof above 1.5, e.g., above about 2. In other words, the later stages of chlorination are conducted at pH values between about 2 and 4, advantageously between about 2 and 3.

The rate at which the reduced non-ferrous metal values react with chlorine increases with temperature; and although the chlorination can be carried out at any convenient temperature up to and including the boiling point of the immersion medium, the temperature of the immersion is advantageously at least about 65°C., for example, in the range between about 75°C. and 95°C. From the standpoint of heat balances, the optimum immersion temperature for commercial operations may be about 85°C., at which temperature provisions for cooling are normally not required and low viscosity pregnant solutions that are easily filtered after leaching are obtained.

Chlorination is most conveniently carried out at atmospheric pressure, but if desired elevated pressures, e.g., up to about 10 atmospheres, can, in appropriate circumstances, be advantageously used. The rate of reaction of the metals with chlorine decreases as chlorination proceeds, and it can, therefore, be advantageous to employ elevated pressures after a substantial part of the non-ferrous metal values has been chlorinated and dissolved. It can also be advantageous to employ elevated pressures in the chlorination of reduced materials containing residual amounts of sulfides, for example those remaining as a residue from the roasting of sulfidic starting materials, or introduced from fossil fuel used to generate the atmosphere for the selective reduction.

The chlorine passed into the immersion reacts directly and rapidly with the non-ferrous metal values present in the reduced material, which are continually leached out of it and go into solution as chlorides. In a batch process, in the absence of ammonia the pH of the solution progressively falls as the chlorination proceeds and the redox potential, $E_H$, increases from a negative value to a positive value, signifying that, in accordance with the International Convention, oxidizing conditions are increasing. For example, an aqueous suspension of a reduced nickeliferous limonite ore is initially substantially neutral or slightly alkaline, e.g., pH 7-9. Dissolution of nickel, cobalt and iron begins at about pH 6.5 and proceeds rapidly until at about pH 4 about 70 % of the nickel is in solution. Addition of ammonia gas can then be begun to maintain the pH at the desired value.

With continued passage of chlorine, leaching of metallic nickel, cobalt and copper and manganous oxide continues, though at a decreasing rate. The $E_H$ increases and solution of the nickel and cobalt is generally substantially complete at an $E_H$ in the range between about 550 and 750 millivolts (mv).

If no ammonia were to be added, the pH value of the immersion could fall during continued chlorination to about pH 1.5 under which conditions substantial amounts of oxides including magnesia and wustite, can be dissolved. Advantageously, the addition of ammonia during the chlorination is made at such a rate as to maintain the pH at a value at least 0.5 pH unit above the minimum value that would be reached by continued chlorination in the absence of ammonia at the temperature used, e.g., at at least 2.0.

The residue remaining after the chloride leaching will contain only small amounts of nickel, cobalt, and copper and the treatment of ores of high iron content, e.g., nickeliferous limonite containing over 40% iron, yields a residue rich in iron oxide. Such a residue, if it is sufficiently rich in iron and is sufficiently free from rock and deleterious impurities, e.g, if it contains more than about 50% iron and less than about 10% silica, can be processed for use as a source of iron for iron and steel making. It is an advantage of the process that elements such as zinc and lead that are deleterious in iron and steel manufacture will, if present in the starting material, have been dissolved as chlorides so that they do not appear in the iron oxide residue. Chromium and aluminum, which may be present in the ore as impurities, e.g., as chromite, can be removed by known methods either before or after reduction and chlorination. Such methods include physical beneficiation procedures such as gravity separation, screening, flotation and magnetic separation, and alkaline roasting, e.g., with sodium carbonate, and leaching with water. Combinations of these methods can, of course, be used.

Although the chlorination has been discussed in relation to a batch process in which the pH and oxidation potential vary, on an industrial scale it is advantageously done continuously in a system in which the additions of chlorine, ammonia or acid-neutralizing, ammonia-containing compounds, reduced material and immersion medium, and the withdrawal of solids and pregnant solution, are correlated so as too maintain a steady state. The chlorination can with advantage be performed in two or more stages controlled at successively lower pH and higher $E_H$ values, the pH in each stage being maintained at a substantially constant value in the range between 2 and 4. For example, the initial rapid reaction to dissolve up to say 75% of the nickel, cobalt and copper can be carried out in the first stage, followed by further extraction in one or more subsequent stages in suitable reactors, if desired, at elevated pressure.

Means that can be used to control the chlorination in both batch and continuous operation include variation of the rate of introduction of chlorine and ammonia, of their partial pressure and of the total gas volume employed. For this purpose inert gas, air or oxygen can be introduced together with the chlorine and the ammonia.

The high rate at which the reduced non-ferrous metal values react with chlorine in aqueous immersion enables such techniques as leaching of the solids in contacting towers or fluid-bed extractors or on continuous filters to be used. One attractive method, at least for the first stage of chlorination, is to employ countercurrent leaching in a contacting tower down which the immersion is passed in countercurrent to an upwardly-flowing stream of chlorine-containing gas.

The pregnant solution containing one or more of nickel, cobalt, copper and manganese together with a minor amount of iron as chlorides can be treated in any desired manner to separate and recover the metal values. If desired the pregnant solution is first separated from the solid residue. Because of the prior selective reduction treatment, this residue generally has a high content of magnetite which facilitates solid-liquid separation and iron oxide-silicate separation by magnetic means.

An advantageous way of separating the metal values is to remove nickel, cobalt, copper or iron from the solution in known manner by means of suitable organic extractants. This can be done either before or after separating the solution from the solid residue, but advantageously the solid residue is first removed and the nickel, cobalt, copper and manganese are separated from each other and from iron in the pregnant solution by means of the organic extractants. Stripping of the loaded organic extractants, e.g., by means of aqueous salt solutions, yields aqueous solutions of the metal chlorides. These can be hydrolyzed or oxidized to their hydrates or oxides and then reduced to metal or the metal chlorides can be reduced to metal with hydrogen. Extraction with organic agents has the advantage of avoiding the problems arising in precipitation procedures. The chloride solutions of the present invention are particularly amenable to treatment by solvent extraction. Furthermore, as a result of their prior chlorination, the accumulation of organic matter such as bacteria and algae at the solvent-solution interface is inhibited.

As an alternative, the nickel, cobalt, copper and manganese and, if desired, any dissolved iron can be simultaneously or selectively precipitated from the pregnant solution, after its separation from the solid residue, as sulfides, carbonates or hydroxides. These can then be treated to isolate the metals by known means, such as those based on carbonylation or fire refining.

For instance, impure nickel sulfide precipitate can be refined by roasting, reduction and carbonylation under elevated pressure as described in British Pat. No. 915,188. Again, a selectively precipitated hydrate of nickel containing some cobalt, copper and iron can be reduced to metal and refined by carbonylation at atmospheric pressure. Yet again impure nickel sulfide precipitate can be melted and cleansed of its cobalt, copper and iron contents in known manner by fusedd sodium chloride-nickel chloride liquid-liquid extraction and the raffinate fire refined to nickel metal by blowing with an oxygen-rich gas and vacuum refining, e.g., as described in Canadian Pat. No. 836,459.

Other known means that can be used to recover and separate the metals in the pregnant solution include electrolysis, evaporation-crystallization, reverse osmosis, electrodialysis and cementation.

Other valuable metals, e.g., aluminum, magnesium, precious metals, silver, and zinc dissolved as chlorides from the reduced material, can also be recovered from the solution.

Chlorine can be recovered from the chlorides, and advantageously is recycled. Methods of chlorine recovery that can be used include thermal hydrolysis or electrolysis of the chlorides; direct conversion of chlorides to oxides and chlorine with oxygen-containing gas at elevated temperatures; reduction of the chlorides with hydrogen, advantageously after separation, to form metal and hydrochloric acid, which then can be electrolyzed or catalytically oxidized to chlorine.

In order to give those skilled in the art a greater appreciation of the advantages flowing from the use of the process in accordance with the present invention, the following illustrative examples are given:

EXAMPLE I

The effects of varying the conditions under which the process is performed are shown by the results of numerous tests. A nickeliferous limonite ore containing 1.5% nickel, 0.18% cobalt, 46% iron, 0.85% manganese, 1.2% MgO and 0.7% CaO was ground finely enough to pass through a 100-mesh B.S. Screen. The ground material was selectively reduced by heating it up to 750°C. during one-half hour in a stream of gas mixture containing, by volume, 30% carbon dioxide, 15% hydrogen and 55% nitrogen and then heating it at 750°C. in the same gas stream for a further 4 hours. The reduced ore was cooled rapidly to room temperature in a current of nitrogen, and then suspended in an aqueous chloride solution to form a slurry containing 10% soldis by weight.

The suspension was heated to 80°C. and chlorine gas, with or without oxygen, was passed into it at a constant rate with stirring, the pH being monitored by means of a glass electrode and the $E_H$ by means of a platinum electrode, using a calomel reference electrode in each case. The pH fell and the $E_H$ increased, and when the pH had reached the desired value a stream of ammonia was passed into the suspension in addition to the chlorine (and oxygen if used) at such a rate as to maintain the pH substantially constant at the desired value. Passage of ammonia was continued for 30 minutes, by which time the $E_H$ had increased to a substantially constant value.

The suspension was then filtered, and the filtrate was analyzed to determine the percentages of the nickel, cobalt and iron that had been extracted.

The conditions and results of the tests on a one liter slurry are set forth in Table I. The "time to final pH" was the time at which the addition of ammonia was commenced.

nesia and 0.7% calcium oxide was ground to 100% minus 100 B.S. Screen and was then heated to 600°C. in hydrogen to reduce substantially all the nickel and cobalt and material amounts of iron.

The reduced ore was pulped with water to form a slurry containing 10% solids, by weight. Chlorine initially at a rate of 20 liters per hour liter of slurry was passed through the slurry which was maintained at 80°C. The pH value and the redox potential of the slurry were continually monitored and the log is shown in Table II. In 35 minutes the pH value of the slurry fell to 2.7 from a starting value of 9.32, and at this point the chlorine flowrate was lowered to 10 liters per hour per liter of slurry.

When the pH value of the slurry fell to 2.6, ammonia at an initial rate of 1.5 liters per hour of slurry was added to the slurry to hold the pH value at about 2.5. The different ammonia flowrates required to maintain the slurry at a pH value of 2.5 are reported in Table II.

When the redox potential increased to 360 mv, chlorination was terminated. Analysis of the pregnant solution confirmed that 94% of the nickel and cobalt were extracted and that only 4.5 % of the iron was extracted even though the ore was not selectively reduced. In a similar test, 45% of the iron was extracted in the absence of ammonia additions.

TABLE I

| Test No. | Gas flow rate (l/h) Cl$_2$ | O$_2$ | Initial pH | $E_H$ (mv) | Final pH | $E_H$ (mv) | Time to final pH (min.) | % Extractions Ni | Co | Fe |
|---|---|---|---|---|---|---|---|---|---|---|
| 1 | 10 | 0 | 8.9 | −520 | 2.5 | +700 | 27 | 91 | 85 | 0.4 |
| 2 | 10 | 0 | 8.86 | −745 | 3.5 | +700 | 20 | 85 | 77 | 0.3 |
| 3 | 10 | 10 | 8.6 | −480 | 2.0 | +660 | 44 | 89 | 83 | 1.1 |
| 4 | 10 | 10 | 8.74 | −300 | 2.5 | +735 | 27 | 90 | 85 | 0.6 |
| 5 | 10 | 20 | 8.85 | — | 2.5 | — | 32 | 90 | 86 | 0.6 |
| 6 | 10 | 20 | 8.8 | −400 | 3.0 | +600 | 28 | 89 | 82 | 0.4 |
| 7 | 10 | 50 | 8.72 | −490 | 3.0 | +550 | 50 | 85 | 83 | 0.5 |
| 8 | 10 | 50 | 8.95 | −770 | 4.0 | — | 30 | 53 | 39 | 0.3 |
| 9 | 10 | 0 | 6.20 | −457 | 2.0 | +847 | 33 | 92 | 85 | 1.9 |
| 10 | 10 | 20 | 6.5 | −495 | 2.5 | +600 | 20 | 88 | 80 | 0.4 |

In Tests Nos. 1 to 8 the aqueous suspension used contained 200 g/l of sodium chloride and in Test No. 9 it contained 200 g/l of ammonium chloride and in Test No. 10 it contained 50 g/l of ammonium chloride.

It will be observed that the highest extractions of nickel and cobalt are obtained at pH values of 2.0 and 2.5 with no oxygen, and that at higher pH values and high oxygen to chlorine ratios the extractions fell off.

In the presence of high concentrations of ammonium chloride, as in Test No. 9, the amount of iron extracted increased.

The results in Table I confirm that by means of the invention 90% of the nickel can be extracted from a reduced limonitic type ore together with less than 1% of the iron. In contrast to this, of ammonia is not used to control the pH several per cent of iron is extracted together with the nickel.

EXAMPLE II

A nickeliferous limonitic ore containing 1.5% nickel, 0.18% cobalt, 46% iron, 0.85% manganese, 1.2% mag-

TABLE II

| Minutes | Cl$_2$ l.p.h./l. slurry | NH$_3$ l.p.h./l. slurry | pH | $E_H$ |
|---|---|---|---|---|
| 0 | 20 | — | 9.32 | −850 |
| 3 | 20 | — | 6.65 | −650 |
| 7 | 20 | — | 6.30 | −615 |
| 10 | 20 | — | 5.9 | — |
| 14 | 20 | — | 5.28 | −455 |
| 17 | 20 | — | 4.87 | — |
| 20 | 20 | — | 4.55 | −420 |
| 25 | 20 | — | 4.00 | −250 |
| 30 | 20 | — | 3.36 | −80 |
| 35 | 10 | — | 2.70 | −280 |
| 37 | 10 | 15 | 2.6 | — |
| 40 | 10 | 15 | 2.48 | 315 |
| 42 | 10 | 22 | 2.47 | 328 |
| 46 | 10 | 22 | 2.51 | 312 |
| 50 | 10 | 19 | 2.50 | 318 |
| 58 | 10 | 26 | 2.50 | 340 |
| 61 | 10 | 26 | 2.50 | 350 |
| 63 | 10 | 26 | 2.50 | 353 |
| 65 | 10 | 26 | 2.50 | 360 |
| 67 | 10 | 26 | — | — |

EXAMPLE III

This example shows the treatment of manganese sea nodules having Sample A, the composition of which is given above. The ore was ground to pass a 100-mesh BSS sieve but to be retained on a 200-mesh sieve, and 10 g. portions were reduced in a silica tube using either hydrogen or a mixture of hydrogen, carbon dioxide and nitrogen in a volume ratio of 1:1:2. In carrying out the reduction the air in the loaded tube was first displaced by the reducing gas, the tube was placed in a furnace at 200°C., the temperature was increased to the value indicated in Table III during 30 minutes, and then maintained at that temperature for 4 hours while the reducing gas was passed through the tube. The reducing gas was then replaced by nitrogen and the tube was cooled rapidly by withdrawing it from the furnace.

The cold reduced ore was then transferred into 100 ml. of water or ammonia chloride solution under a blanket of nitrogen, and the solution was heated to 80°C. and maintained at this temperature with magnetic stirring, to form a slurry of the reduced ore during subsequent treatment. Chlorine was passed into the slurry at a controlled rate of flow of one or two liters per hour, and the progress of the reaction was followed by monitoring the pH and $E_H$. When the leaching was complete the slurry was filtered and washed and the solution and washings were analyzed for Ni, Co, Cu, Fe and Mn for the purpose of calculating extractions which are reported in Table III. The dried residue was also analyzed for Ni, Co and Cu.

It is advantageous to add the ammonai to control the pH in the form of gas rather than as aqueous ammonia or in combination as ammonium carbonate as solid or as an aqueous solution. However, it is added, it has the advantage over other alkalis that it does not precipitate nickel or cobalt from solution. Furthermore, it forms heat-decomposable compounds from which it can be recovered and recycled.

In the presence of ammonia, nickel, cobalt and copper can form cationic ammine complexes, whereas ferric iron does not form such complexes. The formation of these complexes can be advantageous in isolating specific non-ferrous metal values, such as nickel.

tative extractions of the non-ferrous metals, but 94% of the iron was also dissolved. Only when the pH during the leaching was controlled in accordance with the invention (Tests 2 to 4) was the dissolution of iron effectively inhibited while maintaining high extractions of the other metals.

Comparison of Test 2 with Test 4 demonstrates the advantageous effect on iron inhibition of using a pH above 2.5 rather than a pH of 2.0.

The variation of the pH and $E_H$ of the slurry with time is shown by the results in Table IV, which relate to Test 12. In this Experiment chlorine was pased into the slurry at the rate of 2 l./hr. for 42 minutes, until the pH had been lowered to 3, whereupon the chlorine flow rate was lowered to 1 l./hr. and ammonia was passed at the rate of approximately 1 l./hr. so as to maintain the pH at 3 for a further 30 minutes.

TABLE IV

| Time (Mins.) | pH | $E_H$ |
|---|---|---|
| 0 | 8.08 | −640 |
| 2 | 7.02 | −620 |
| 5 | 6.85 | −550 |
| 8 | 6.69 | −480 |
| 10 | 6.55 | −290 |
| 15 | 6.23 | + 5 |
| 20 | 5.80 | +130 |
| 25 | 5.49 | 205 |
| 30 | 5.05 | 345 |
| 35 | 4.40 | 490 |
| 39.5 | 3.33 | 620 |
| 42 | 3.1 | 650 |
| 43 | — | — |
| 47 | 3.0 | 665 |
| 49 | 3.05 | 665 |
| 52 | 3.0 | 690 |
| 58 | 3.0 | 675 |
| 65 | 3.02 | 680 |
| 70 | 3.00 | 710 |
| 73 | 3.00 | 700 |

TABLE III

| Test No. | Reduction Gas | Reduction Temp. (°C.) | NH₄Cl in leach solution (%) | Chlorination Temp. (°C.) | Chlorination Gas flows | Final pH | Final $E_H$ | % Extraction Ni | Co | Cu | Mn | Fe |
|---|---|---|---|---|---|---|---|---|---|---|---|---|
| 11 | H₂ | 500 | — | 80 | 2 l./hr. Cl₂ for 1 hr. | 1.35 | 960 | 74 | 34 | 96 | 32 | 11.2 |
| 12 | H₂ | 400 | 20 | 80 | 2 l./hr Cl₂ to pH 3.0, then NH₃ + 1 l./hr. Cl₂ for 30 mins. | 3.0 | 700 | 90 | 91 | 84 | 67 | 0.6 |
| 13 | H₂ | 400 | 55 | 80 | 2 l./hr. Cl₂ to pH 3.0, then NH₃ + 1 l./hr. Cl₂ for 30 mins. | 3.0 | 700 | 85 | 95 | 99 | 73 | 0.6 |
| 14 | H₂ | 400 | 2 | 80 | 2 l./hr. Cl₂ to pH 2.0, then NH₃ + 1 l./hr. Cl₂ for 30 mins. | 2.0 | 870 | 82 | 99 | 99 | 88 | 1 |

Of the tests in Table III, Nos. 2 to 4 are in accordance with the invention, and No. 1 is included for the purpose o comparison.

The result of Test No. 11 shows that if the reduced ore is chlorinated in aqueous suspension in the absence of ammonium chloride, the extraction of nickel is generally less than 75% and those of cobalt and manganese are much lower, while substantial amounts of iron are dissolved. An attempt to limit the solution of iron by employing a hydrogen-carbon dioxide mixture as the reducing gas lowered the extractions of nickel and manganese to 29% and 19%, respectively.

The use of an aqueous ammonium chloride leaching solution without control of the pH gave almost quanti- The use of chlorine in association with ammonia also tends to dissolve any nickel, copper or cobalt that may be present in the form of sulfides, and under appropriate conditions of $E_H$, pH, temperature and pressure, nickel, cobalt and copper sulfides can be selectively dissolved relative to iron sulfides by combined treatment with chlorine, oxygen and ammonia.

It is noteworthy that these high extractions were obtained without the need to employ elevated temperatures or pressures or highly corrosive conditions, and the process is of particular value for the treatment of cobaltiferous materials in an economic manner.

The process of the invention has numerous practical advantages. It is simple and flexible, and because of the very high rate of the reaction with chlorine the chlorination can be carried out in relatively small reactors. The high solubility of the reaction products and the high mobility of their ions ensures that the reaction products do not form a barrier to the diffusion of the chlorine to the metal surface, which remains active. The high solubility of the chlorides formed permits operation with concentrated solutions and also enables high solid-liquid ratios to be used in the leaching stage. The concentrated solutions are particularly amenable to treatment by solvent extraction techniques for separating and recovering dissolved metal values. Alternatively, the pregnant solution or a slurry of chemical concentrates therefrom, e.g., sulphides, hydroxides or carbonates precipitated therefrom can readily be transported for refining elsewhere. Chlorination in an aqueous medium allows satisfactory control of the chlorinating temperature, and the fact that sea water can be used as the aqueous medium can have major advantages. The high but selective reactivity of the chlorine with the metals to be extracted enables high temperatures to be used in the pyrometallurgical selective reduction, thus avoiding temperature limitations imposed in processes in which extraction is by less reactive agents. Consequently this reduction can be performed simply and rapidly with the use of relatively cheap reductants, and magnesia in silicate materials can be fixed as relatively inactive silicates.

Other advantages of the process include the possibility that since leaching temperatures at or near the boiling point can be used, expensive additional cooling arrangements may not be required; the relatively low viscosity of the aqueous medium at the temperatures used; and the relatively low vapor pressure of chlorine over the solutions.

The present process may be used in conjunction with other established processes for the treatment of materials containing one or more of nickel, cobalt, copper and manganese together with iron. For example, the selectively reduced oxide material can be subjected, before chlorination, to carbonylation at either atmospheric or higher pressure, or to ammonia leaching, to extract part of the nickel or cobalt therefrom. The subsequent chlorination then serves to extract nickel, cobalt, copper and manganese remaining in the residues from these processes.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for selectively leaching at least one reduced non-ferrous metal value selected from the group consisting of nickel, cobalt, copper, and manganese from a ferruginous material containing the non-ferrous value which comprises reducing said ferruginous material to reduce to metal substantially all of said non-ferrous metal value from the group consisting of nickel, cobalt and copper but not more than 5 parts of iron for each part in total of said nickel, cobalt and copper forming an aqueous immersion of said reduced ferruginous material, introducing gaseous chlorine into the immersion to chlorinate the metallic non-ferrous metal values and to produce an aqueous solution of the chlorinated non-ferrous metal values, adding at least one compound selected from the group consisting of ammonia and ammonia-containing compounds to the aqueous solution in amounts sufficient to maintain the pH value thereof between about 4 and 2 so that said reduced non-ferrous values are extracted from the ferruginous material while chlorination of said reduced iron is inhibited and recovering the non-ferrous metal value from the aqueous solution.

2. The process as described in claim 1 in which the ferruginous material is an oxide material which contains the non-ferrous metal value in the oxidized state and the oxide material is reduced at a temperature between about 500°C. and 950°C.

3. The process as described in claim 2 where the oxide material is selectively reduced in an atmosphere having a reducing potential equivalent to a carbon monoxide to carbon dioxide ratio between about 1:6 and 2:1 to reduce to metal substantially all non-ferrous values from the group consisting of nickel, cobalt and copper and any manganese to manganous oxide.

4. The process described in claim 3 in which the ratio of the iron reduced to metal to the total content of the non-ferrous metal value from the group consisting of nickel, cobalt and copper reduced to metal in the reduced material does not exceed 3:1 by weight.

5. The process described in claim 3 in which the reduced material, before chlorination, is slowly cooled under a protective atmosphere so as to cause disproportionation of wustite therein into metal and magnetite.

6. The process described in claim 3 in which the reduced material, before chlorination, is selectively reoxidized by exposure to an agent from the group consisting of carbon dioxide and water vapor to convert part of the metallic iron to iron oxide without reoxidizing reduced metal from the group consisting of nickel, cobalt and copper.

7. The process described in claim 3 in which the reduced material, before chlorination, is simultaneously cooled and selective reoxidized by direct contact with water or steam.

8. The process described in claim 1 in which the chlorination is performed at a temperature of at least 65°C.

9. The process described in claim 1 in which the water contains chloride ions in solution.

10. The process described in claim 9 in which the water is sea water.

11. The process described in claim 1 in which chlorination is performed with the pH of the chloride solution below about 4, but above 2.

12. The process described in claim 11 in which the last stage of the chlorination is performed with the pH of the chloride solution in the range 2 to 3.

13. The process described in claim 1 in which the chlorination is performed in at least two stages.

14. The process described in claim 13 in which at least one stage after the first is performed at superatmospheric pressure.

15. The process described in claim 1 in which the solution is separated from the solids and the non-ferrous metal value is precipitated from solution as a sulfide, hydroxide or carbonate.

16. The process described in claim 15 applied to a material containing nickel, cobalt and copper in which these metals are precipitated from the solution as sulfides; copper and cobalt are removed from the molten nickel sulfide by fused chloride salt solvent extraction;; and the molten nickel sulfide is oxygen-blown to metallic nickel.

17. The process described in claim 15 applied to a material containing nickel, cobalt and copper in which these metals are precipitated from the solution as hydroxides or carbonates; the hydrates or carbonates are reduced to metal; and nickel is recovered from the metal by carbonylation.

18. The process described in claim 1 in which chlorine is recovered from the aqueous solution and used to chlorinate a further quantity of reduced material.

19. The process described in claim 3 in which the oxide material is an oxide ore of the non ferrous metal value.

20. The process described in claim 19 in which the ore is nickeliferous limonite.

21. The process described in claim 20 in which the ore contains above 40% iron and an iron-oxide-rich residue from the chlorination is recovered.

22. The process described in claim 19 in which the ore is a nickeliferous magnesium silicate ore and the ore is heated during reduction to a temperature of at least about 750°C.

23. The process described in claim 3 in which the oxide material is a calcine made by roasting a ferruginous material containing at least one element from the group consisting of sulfur and arsenic and at least one non-ferrous metal value from the group consisting of nickel, cobalt and copper.

24. The process described in claim 23 in which the material is nickeliferous pyrrhotite.

25. The process described in claim 23 in which the material is pyrite containing a non-ferrous metal value from the group consisting of cobalt and copper.

26. The process described in claim 3 in which the selectively reduced material is subjected to carbonylation or ammonia leaching to extract part of the nickel therefrom and the residue is then chlorinated.

27. The process as described in claim 1 in which the ferruginous material is a manganiferous oxide ore and is reduced to manganous oxide at a temperature between about 300°C. and 950°C.

28. The process as described in claim 27 where the manganiferous oxide ore is manganese sea nodules which are reduced in an atmosphere having a reducing potential equivalent to a carbon monoxide to carbon dioxide ratio between about 1:6 and 2:1 to reduce manganese to manganous oxide values.

29. The process described in claim 28 in which the manganiferous ore is manganese sea nodules, and in which the aqueous immersion medium contains about 2% to about 25%, by weight, of ammonium chloride.

* * * * *

UNITED STATES PATENT OFFICE
CERTIFICATE OF CORRECTION

PATENT NO. : 3,880,651
DATED : April 29, 1975
INVENTOR(S) : Paul Etienne Queneau, Herm Jan Roorda and Stanley Charles Townshend.

It is certified that error appears in the above-identified patent and that said Letters Patent are hereby corrected as shown below:

In the heading, insert -- Assignee: The International Nickel Company, Inc., New York, N.Y. --.

Column 3, line 63, after "advantageously" delete "in".

Column 6, line 62, after "e.g.," delete "at".

Column 6, line 63, delete "chloride" and insert -- chlorine --.

Column 9, line 8, delete "soldis" and insert -- solids --.

Column 9, line 61, after "this," delete "of" and insert -- if --.

Column 10, line 17, after "hour" insert -- per liter --.

Column 11, line 27, delete "ammonai" and insert -- ammonia --.

Column 11, line 58, delete "o" and insert --of--.

Column 12, line 13, delete "pased" and insert -- passed --.

Column 14, line 45, at the end of claim 8 after "65°C." insert --up to and including the boiling point of the chloride solution.--.

Column 15, line 2, after "extraction;" delete ";".

Signed and Sealed this second Day of December 1975

[SEAL]

Attest:

RUTH C. MASON
Attesting Officer

C. MARSHALL DANN
Commissioner of Patents and Trademarks